Jan. 11, 1966     D. C. SHEWMON     3,228,103
METAL CLADDING
Filed May 8, 1961     2 Sheets-Sheet 1
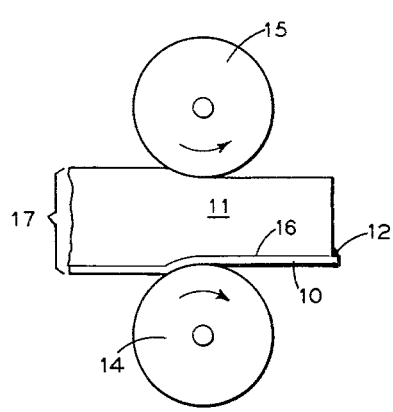
FIG. 2
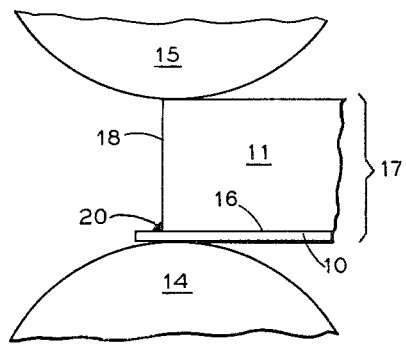
FIG. 3
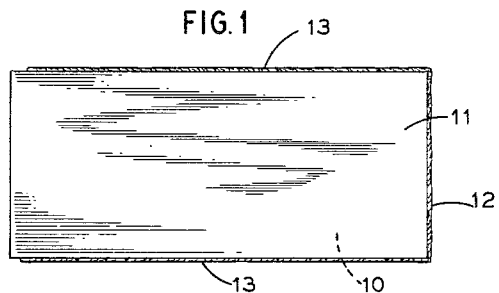
FIG. 1
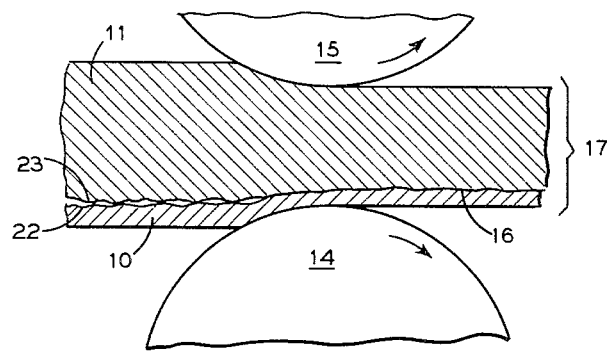
FIG. 4
INVENTOR.
Daniel C. Shewmon
BY 
ATTORNEY INVENTOR.
Daniel C. Shewmon 3,228,103
METAL CLADDING
Daniel C. Shewmon, Wadsworth, Ohio, assignor to The Babcock & Wilcox Company, New York, N.Y., a corporation of New Jersey
Filed May 8, 1961, Ser. No. 108,531
5 Claims. (Cl. 29—471.5)

This invention relates to a method of and apparatus for forming a composite metal element and more particularly to a method of cladding a base metal with a protective metal covering.

Metal cladding has been performed for many years and highly satisfactory clad plates and other metallic objects have been obtained. However, the art has established the requirement for satisfactory bonding between, for example stainless steel and a carbon steel element as necessitating certain steps which utlimately require a major reduction in the thickness or cross-sectional area of the clad object before the bonding is satisfactory. For example, one of the most satisfactory cladding processes requires the heating of the metals forming the composite plate or other object to a forging temperature and then rolling or otherwise working the composite object to reduce its cross-sectional area to approximately 20% of the original cross-sectional area.

In accordance with my invention, I have found that satisfactory bonding may be obtained by cold working followed by heating and hot working where the total reduction in cross-sectional area of the finished element is considerably less than that heretofore considered necessary. This has been accomplished by seal welding, for example, one end and the sides of the plates and cold working the composite plate or element to evacuate air from the interface contact area of the dissimilar metals. Thereafter, the open end is seal welded under pressure at the end of the cold working procedure. Such cold working causes a reduction in thickness or cross-sectional area of the element and apparently results in a mechanical interlocking of the crystals of the two metals at their interface accompanied by a partial deformation of the surfaces of both portions of the composite element and thus inducing a residual stress between the crystals. With the air evacuated from the interface between the two plates, subsequent heating of the composite element to a forging temperature precludes the formation of metal oxides heretofore usually present in the interface area of the bond. In any event, the subsequent heating and hot working under forging temperature conditions with a further reduction in cross-sectional area completes the bond between the metals so that the resultant composite or clad article or element is well bonded and not subject to separation even under the usual bending tests.

Advantageously, the total reduction in cross-sectional area resulting from both cold and hot working a composite metal plate according to the present invention is considerably less than that required to obtain a satisfactory bond between the metals with hot working alone, as taught in the art. The percent reduction in cross-sectional area by either my new procedure or the known procedures varies in dependence upon the characteristics and the thickness of the base metal and the cladding metal. Under ideal or closely controlled conditions with the procedure of the present invention, and with relatively thin plates, bonding is possible with cold reduction followed by heating only.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

In the drawings:

FIG. 1 shows the initial preparation of a composite element according to the present invention;

FIG. 2 illustrates, in exaggerated scale, the cold working of the composite element of FIG. 1;

FIG. 3 illustrates the final step in the cold working step wherein the interface is seal welded after evacuation of air;

FIG. 4 is an enlarged greatly exaggerated section showing the mechanical mating of the dissimilar metals during the cold working stage.

Figure 5:
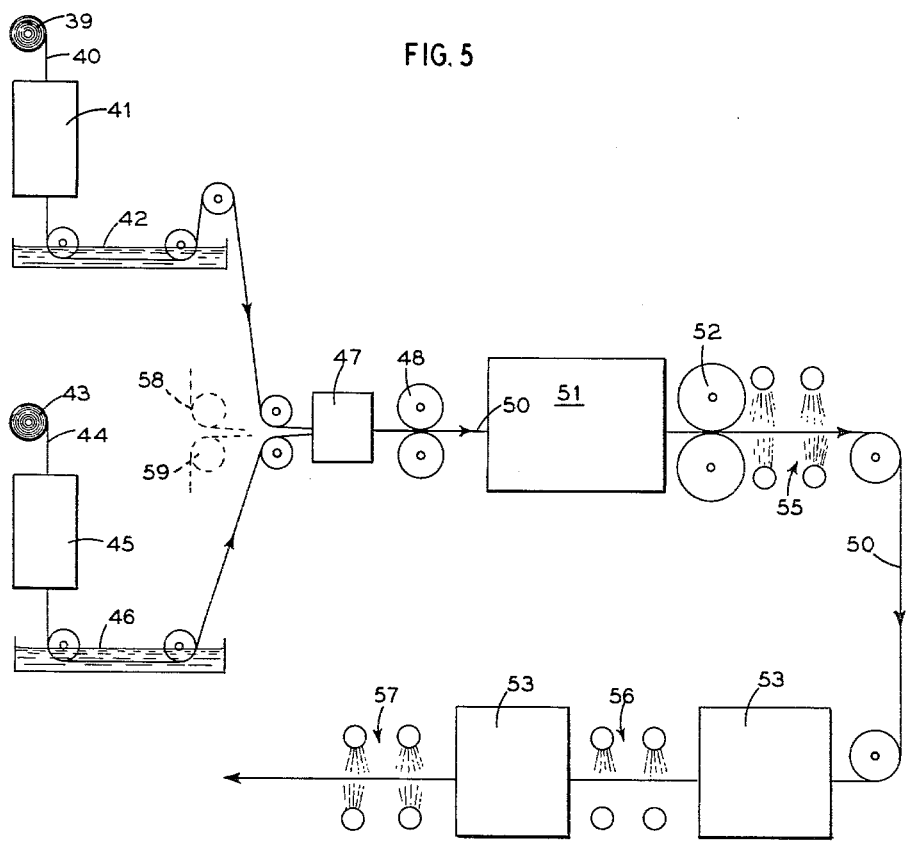
FIG. 5 illustrates apparatus for continuously forming a composite metal strip according to the method of the invention.

As shown in FIG. 1, a cladding metal plate 10 such as stainless steel is superimposed upon a base metal plate 11 such as low carbon steel so that the configuration of both plates are substantially the same. The two plates are seal welded along one end 12 and both sides 13 before cold working the composite plate or element.

After the plates have been joined as shown in FIG. 1, the element is cold worked starting at the seal welded end 12 of the composite element. As shown in FIG. 2, the cold working may be performed between pressure rolls 14 and 15 where the sealed end 12 of the element shown in FIG. 1 becomes the leading edge in the passage of the element between the rolls. It is desirable to effect a reduction in the cross-sectional area of the composite element during the cold working stage of the process. With the leading edge and the sides of the elements seal welded, the cold working or cold rolling evacuates any air entrapped at the interface 16 between the two metal plates 10 and 11. In addition, the reduction in cross-sectional area will cause a mechanical interlocking between the metal crystals during the period of cold deformation and air evacuation. The cold working of the interface strains and deforms the metal, storing energy in the grains at and adjacent to the interface which is released upon either heating to a forging temperature or during hot working, or both.

The composite element 17 or plate is passed through the cold working rolls at a relatively slow speed. For example, when using rolls 14 and 15 as disclosed in FIG. 2, the rate of passage may be as low as 12" per minute with a reduction in cross-sectional area or thickness of, for example, as little as 2 to 4%.

As shown in FIG. 3, the rolls 14 and 15 are stopped when the composite element 17 has substantially completed its travel between the rolls. At this point, the trailing edge 18 is seal welded as at 20 so that when the element is removed from the rolls, air will be effectively excluded from the interface 16 between the metals 10 and 11 during subsequent handling.

After cold working the composite element 17, with a reduction in cross-sectional area such as that indicated, the element is heated to a forging temperature of, for example, 2250° F. and, if necessary, subjected to hot working. The hot working may take the form of a rolling operation, where the reduction in cross-sectional area may be of the order of from 1 to 10%. During the hot stage, the metals will be bonded or welded together to form a unitary piece. Apparently, the residual intercrystalline stress in the interface 16 resulting from the cold working aids in effecting a permanent and exceptionally strong bond between the base metal 11 and the cladding metal 10 during the hot working. The slight hot reduction in cross-sectional area of the composite or clad element 17 is merely reassurance of good bond and should be kept to a minimum, 1 roll pass, for instance. Under ideal or well controlled conditions, two or more metals could be cold rolled, sealed and then just heated to effect a bond. Following the hot stage of the process, the metal may be stress relieved by heat treatment as desired.

The effect of the cold working stage of the cladding process is shown in exaggerated form in FIG. 4. After the plates 10 and 11 have been cleaned by machining, shot blasting, pickling or other well known means, one or both of the plates may be coated to facilitate bonding of the engaging faces of the plates. Such coating may be of nickel, which may be electrolytically deposited to a thickness of .003 inch, for example. Thereafter, the plates are positioned and seal welded as shown in FIG. 1, and as hereinbefore described. It will be understood that the usual commercial preparation of the plates cannot economically justify ground or polished matching faces, so that under the best of conditions the surfaces of contact will be relatively rough, particularly when viewed through a microscope, so that initially a large percentage of the area between the plates 10 and 11 will not be in actual contact. This is illustrated in FIG. 4 by the faces 22 and 23 of the plates 10 and 11, respectively.

When the plates 10 and 11 are cold worked for a reduction in thickness, as by the pressure rolls 14 and 15, the metals in contact will flow, with particularly the softer of the two metals flowing into the depressions at the interface with the other metal, causing an interlocking of and a storage of energy in the metal crystals at and adjacent the interface 16. The cold working action will also force the air from the voids in the interface area so that when the seal weld 20 is applied, as described, no active oxidizing agent will be present at the interface during the subsequent heating and hot working of the plates. The plastic flow of the metal into the voids at the interface during cold working does not create sufficient metal temperature to form any appreciable amount of metal oxide contaminants, such as would occur during the usual hot working process. Thus when proceeding to the hot working stage, according to the invention there is substantially no oxygen present to form metal oxides.

It will be understood the cold working of the composite plate to evacuate the air and to effect mechanical intergranular locking of the crystals in the interface area aids the bonding or welding of the metals during the hot working stage. As a result, an effective bond will be made between the metals with a reduced reduction in area required as compared with previous cladding systems. In general, the procedure of the present invention permits a considerably reduced total reduction in the metal working necessary to obtain an effectively clad metal element when compared with previously known procedures. It will also be understood that both the cold and hot working steps of the present invention can be accomplished by any procedure or combination of procedures such as rolling, pressing, slamming, exploding, or the like.

In a series of cladding tests, carbon steel plates 1 1/16" thick were joined with 1/2" thick stainless steel plates. Following the procedure of the present invention, the composite plate was cold rolled for a reduction of 15%, heated to a forging temperature of 2350° F. and hot rolled to a further reduction of 67%, resulting in a composite plate .43" thick and an overall reduction of 3.6 to 1. In a full flattening test, all of the composite test plates maintained a complete bond and no failure occurred in the bonded area interface. Some of the composite plates were formed with a thin layer of electro-deposited nickel of about .003" thickness on the stainless steel prior to the three-side seal welding and cold rolling of the composite plate. One of the composite plates did not utilize any metallic deposit in the interspace between the surfaces of the carbon steel and the stainless steel. Each of the test plates was further tested for shear strength on the bond between the metal. Plates having a layer of nickel therebetween had the higher shear strength, as would be expected, but the plate without nickel had a shear strength of the order of 50,000 p.s.i.

In another cladding test, a carbon steel plate 1.00" thick was combined with a sheet of nickel .005" thick and a stainless steel plate .470" thick to form a sandwich. The element was cold rolled according to the procedure of the invention to a thickness of 1.476", i.e. a reduction of 3.3% and hot reduced to 1.28" thickness. The total reduction was only 13.3% or a ratio of 1.12 to 1, and the metallurgical bond between the plates was proper and sufficient to withstand the usual bending tests without failure.

An apparatus for performing the method of the invention is illustrated in FIG. 5, wherein a continuous clad strip is formed for use in the production of welded tubing, for example. As shown, a coil 39 of stainless steel strip 40 is mounted on a shaft so that it will be drawn through, for example, an abrasive cleaning booth 41 where all sides of the strip are subjected to the cleaning effects of a sand blast. Thereafter the strip may be passed through a plating bath 42 for the electro-deposit of nickel thereon, for example. A coil 43 of carbon steel strip 44 is likewise provided with cleaning means such as a sand blast chamber 45 so that the steel strip may be continuously cleaned and then passed through a bath 46 for the deposition of, for example, nickel thereon, if desired. The stainless steel and carbon steel strips are passed in proper registry through an edge welder 47 so that the edges of the strips may be sealed in accordance with the present invention. Upon initially joining the strips in the edge welder 47, the leading edge will also be sealed by welding and as the strips are passed through the cold rolls 48, the air is evacuated and the metals of the composite strip cold worked for mechanical interlocking as hereinbefore described. When the trailing edge of the composite strip reaches the rolls 48, it is also seal welded while still under roll pressure as hereinbefore described.

The composite strip 50, after cold working is passed through a heating furnace 51 to bring the strip to a forging temperature and then hot worked by passing through rolls 52. The combination of cold and hot working bonds the metals and the composite strip 50 may thereafter be heat treated in furnaces 53 and 54 as desired, with suitable quenching as at 55, 56 and 57, and inspected for the continuous production of a bonded clad strip. Such a continuous process of cladding is particularly useful in the production of strip for the manufacture of welded tubing.

It will be understood the present invention is not limited to the cladding of stainless steel on carbon steel, and depending upon the materials being joined, an intermediate material to aid in the material bonding may or may not be required. Likewise, it will be understood, more than two materials with or without an intermediate bonding material may be joined according to this invention. As shown in dotted lines in FIG. 5, rolls 58 and 59 may be used to supply a third and/or fourth strip to the composite strip element bonded in the apparatus shown. Such third and/or fourth strips may be of different materials than those supplied from the coils 39 and 43, or could be a similar material.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. The method of forming a composite metal element from metals having dissimilar physical characteristics which comprises the steps of positioning cleaned flat surfaces of said dissimilar metal elements in face-to-face relationship, seal welding one end and the sides of the periphery of said elements, cold working the elements from said seal welded end to evacuate the air from between said faces and to cause deformation of said metal elements and a mechanical interlocking of the metal crystals, seal welding the open end of said element while said open end portions are held in a compressed condition, and heating said composite element to a forging temperature to effect a welding juncture between said dissimilar metals throughout the surface of contact therebetween.

2. The method of forming a composite metal plate which comprises the steps of positioning cleaned plates of dissimilar metals in face-to-face relationship, seal welding one end and the two sides of said plates, cold rolling the plates from said seal welded end to evacuate the air from between said faces and to cause a mechanical interlocking of the metal crystals, seal welding the open end of said plates while said open end is in a compressed condition, heating said composite plate to a forging temperature, and hot rolling said composite plate to effect a welding juncture between said plates throughout the surface of contact therebetween.

3. The method of forming a clad metal plate which comprises the steps of positioning cleaned plates of dissimilar metals in face-to-face relationship, seal welding one end and the two sides of said plates, cold rolling the plates from said sealed end to reduce the cross-section thereof to evacuate the air from between said faces and to cause a mechanical interlocking of the metals by plastic flow of both of said metals, seal welding the open end between said plates while said open end is being maintained in a compressed condition, heating said composite plate to a forging temperature, and hot rolling said composite plate to reduce the cross-section thereof and to effect a welding juncture between said plates through the surface of contact therebetween.

4. The method of cladding carbon steel with stainless steel which comprises the steps of positioning cleaned flat surfaces of said steels in face-to-face relationship, seal welding one end and the two sides of said steels, cold working the joined steels from said seal welded end to evacuate the air from between said faces and to cause deformation and a mechanical interlocking of the metals, seal welding the open end of said joined steels while maintaining said open end in a compressed condition, heating said joined steels to a forging temperature, and hot working said joined steels to effect a welding juncture between said carbon and stainless steels throughout the surface of contact therebetween.

5. The method of forming a clad metal strip which comprises the steps of positioning cleaned strips of carbon and stainless steel in face-to-face relationship, seal welding one end and the two sides of the composite strip, cold rolling the composite strip from said seal welded end to evacuate the air from between said faces and to cause a mechanical interlocking of the metals, seal welding the open end of said composite strip while maintaining said open end in a compressed condition, heating said mechanically interlocked strips to a forging temperature, and hot rolling said composite strip to effect a welding juncture between said strips throughout the surface of contact therebetween and to form a clad strip.

References Cited by the Examiner

UNITED STATES PATENTS

| | | | |
|---|---|---|---|
| 2,558,093 | 6/1951 | Kinney | 29—488 |
| 2,718,690 | 9/1955 | Ulam | 29—470 X |
| 2,744,314 | 5/1956 | Kinney | 29—471.5 |
| 2,782,497 | 2/1957 | Campbell | 29—471.5 |
| 2,879,587 | 3/1959 | Mushovic et al. | 29—488 |
| 2,961,761 | 11/1960 | Watson et al. | 29—471.5 X |
| 3,150,455 | 9/1964 | Butt | 29—471.5 |

JOHN F. CAMPBELL, *Primary Examiner.*